United States Patent Office 2,952,699
Patented Sept. 13, 1960

2,952,699

PREPARATION OF SUBSTITUTED PHOSPHORIC ACIDS

George R. Norman, Cleveland, Ohio, assignor to The Lubrizol Corporation, Wickliffe, Ohio, a corporation of Ohio No Drawing. Filed Dec. 23, 1955, Ser. No. 554,935

8 Claims. (Cl. 260—461)

This invention relates to the preparation of certain substituted phosphoric acids by means of a process which involves the oxidation of organic phosphites. In a more particular sense, the invention relates to such a process in which the oxidizing agent is sulfur trioxide.

The substituted phosphoric acids of this invention are those which conform to the structural formula

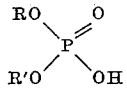

where R and R' are organic radicals. Compounds of this type are of considerable value in the metal-treatment art wherein they may be applied to metallic surfaces, particularly ferrous metal surfaces, to provide a pitted surface thereon which acts as a reservoir for liquid lubricants, thus enabling the metal surface to withstand initial periods of extreme pressure; likewise, the substituted phosphoric acids of this invention may be used to provide a protective rust-resisting coating to ferrous metal surfaces.

Previously known methods of preparing such substituted phosphoric acids included the reaction of alcohols or phenols with phosphorus pentoxide, the alkaline hydrolysis of the corresponding phosphoridic halides followed by acidification of the resulting salt, reaction of alcohols or phenols with phosphoric acid, etc. None of these methods are entirely satisfactory for the preparation of the substituted phosphoric acids, either for reasons of the purity of the product obtained, or the low yield of such a product, or the expense of the raw material.

It is accordingly a principal object of the present invention to provide a process for the preparation of substituted phosphoric acids. It is a further object to provide such a process which is convenient and economical, both by reason of operability and availability of raw materials.

Other objects of the invention will be apparent from the ensuing description thereof. A process has been discovered whereby certain substituted phosphoric acids may be prepared by the oxidation of organic phosphites. In a more specific consideration the invention consists of the process of preparing substituted phosphoric acids having the structure

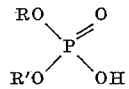

which comprises reacting sulfur trioxide with a substituted phosphite having the structure

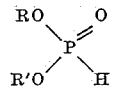

where R and R' are the same or different organic radicals, each attached to oxygen through a carbon atom which except for its attachment to the oxygen is attached only to elements selected from the group consisting of carbon and hydrogen.

The reaction of the above described substituted phosphite with sulfur trioxide is an oxidation reaction and is represented by the following equation.

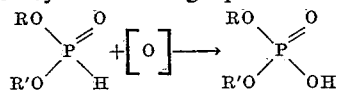

The oxygen [O] in the above equation is supplied by the sulfur trioxide reactant, which may subsequently be converted to sulfur dioxide, although the exact mechanism of the reaction and disposition of incidental by-products is not known.

The substituted phosphites which are used as raw materials in the process of this invention are as indicated in the structural formula di-substituted phosphites. Such compounds are readily available from the reaction of phosphorus trichloride with one or more of the appropriate alcohols or phenols. This reaction is well known and in the case of alcohols generally requires a mol ratio of reactants of 3:1 (alcohol: phosphorus trichloride). In the preparation of aromatic phosphites which contain two organic substituents, this reaction generally involves a mol ratio of reactants of 2:1.

The conditions of the reaction of this process are quite simple. It is necessary only to bring the two reagents together at moderate temperature to effect the desired oxidation. Inasmuch as the sulfur trioxide has a relatively low boiling point, it is convenient to carry out the reaction by introducing the sulfur trioxide into the particular substituted phosphite by bubbling gaseous sulfur trioxide beneath the surface of the substituted phosphite when the latter is a liquid or beneath the surface of a solution or suspension of the substituted phosphite when the latter is a solid. The use of a solvent is as noted above particularly desirable in such instances in which the substituted phosphite is a solid. The use of a solvent is indicated also when it is considered desirable to control the reaction temperature within narrow limits. In most cases, however, it is not necessary to employ a solvent inasmuch as the reaction generally proceeds quite satisfactorily without a solvent.

Introduction of the sulfur trioxide into the reaction mass may be accomplished as mentioned hereinbefore merely by bubbling this gaseous reactant beneath the surface of the fluid reaction medium. A desirable variant of this procedure involves entrainment of liquid sulfur trioxide by a stream of dry air, which entrained sulfur trioxide then is introduced with the air beneath the surface of the fluid reaction medium. This variant affords advantages of better temperature control as well as an increased efficiency of utilization of the sulfur trioxide in the process. It is accomplished by passing a stream of dry air over the surface of a reservoir of liquid sulfur trioxide and thence into the reaction mass. The reaction proceeds quite satisfactory in most instances at room temperature. It may in some instances be carried out at lower temperatures with a corresponding reduction in the reaction rate, and likewise it may be carried out at higher temperatures with due concern for a proportionately increased rate of reaction. Ordinarily, however, it is preferred to maintain the reaction temperature within the range of 20–75° C.

Isolation of the desired substituted phosphoric acid from the process mixture of this invention may be accomplished simply by washing the crude process mixture with water to remove any inorganic contaminants. It may be advantageous in such a washing step, first, to dissolve the process mixture in a solvent if no solvent has been used in the process so as to effect a more complete removal of the inorganic contaminants. In such cases it is necessary also, of course, to remove the solvent by distillation. The residue is the desired product. Further purification usually is unnecessary, but may be accomplished by further washing and extraction procedures. Distillation of the substituted phosphoric acids is not convenient because of their extremely high boiling points.

While the stoichiometry of the reaction of this process is not known, it has been presumed that the reaction proceeds according to the equation:

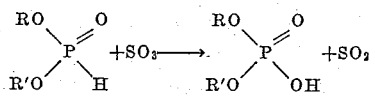

From this equation it will be seen that the reactants are utilized on an equimolar basis. Generally this is the preferred ratio of reactants in the process for obvious reasons of economy, although the use of an excess of either of the reactants likewise is contemplated and in such instances where one of the two reactants may be considerably cheaper than the other, it may be desirable to use an excess of the cheaper reactant.

The identity of the organic radicals identified by R and R' in the structural formulas contained herein is such that their attachment to the oxygen of these structural formulas is hydrocarbon in nature. By the terminology "hydrocarbon in nature" it is meant that the carbon atom of these organic radicals which is attached to the oxygen of the structural formulas is attached also only to elements selected from the group consisting of carbon and hydrogen, thus such radicals will comprise the following structures:

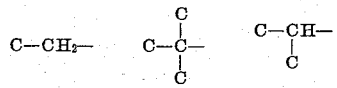

In each of the above represented structures the dangling valence is attached to the oxygens of the substituted phosphites or phosphoric acids of this invention.

Illustrative classes of such organic radicals include both hydrocarbon and substituted hydrocarbon radicals. While the availability of substituted phosphites in which these organic radicals are hydrocarbon is greater than the availability of phosphites in which these organic radicals are of non-hydrocarbon structure, nevertheless, the process of this invention is applicable equally to both classes of substituted phosphites.

Specific examples of organic radicals represented by R and R' in the structural formulas representing the substituted phosphites and phosphoric acids of this invention, include the following: methyl, ethyl, 2-chloroethyl, isopropyl, sec-butyl, tert-butyl, sec-tert-butyl, tert-amyl, neopentyl, 2-methyl-4-amyl, 2-ethylhexyl, nonyl, 3,5,5-trimethyl, hexyl, decyl, hexadecyl, eicosyl methylcyclohexyl, phenyl, benzyl, beta-phenethyl, xenyl, p-chlorophenyl, o-bromophenyl, alpha-furyl, alpha-tetrahydrofuryl, beta-methoxyethyl, p-nitrophenyl.

The reaction is illustrated further by the following examples which are intended merely to be illustrative and not limiting.

*Example 1*

A 230-gram (0.78 mole) sample of di-n-octyl phosphite was cooled to 20° C. and treated with a mixture of air and entrained sulfur trioxide for four hours. During this time a total of 62.5 grams (0.78 mole) of sulfur trioxide was introduced into the reaction mass. The resulting product was dissolved in diisopropyl ether and washed three times with water. Removal of the diisopropyl ether by heating to a final temperature of 110° C. at 25 mm. yielded the corresponding di-n-octyl phosphoric acid having the following analysis:

Phosphorus _____percent__ 9.5

*Example 2*

The procedure of Example 1 was followed using 270 grams (0.77 mole) of di-n-decyl phosphite and 61.6 grams of sulfur trioxide. The resulting di-n-decyl phosphoric acid showed the following analyses:

Phosphorus _____percent__ 6.8
Acid number _____ 135

*Example 3*

The procedure of Example 1 was followed using 500 grams (2.0 moles) of di-n-hexyl phosphite and 160 grams of sulfur trioxide. The residual di-n-hexyl phosphoric acid showed the following analysis:

Phosphorus _____percent__ 11.3

*Example 4*

The procedure of Example 1 was followed using 143 grams (0.65 mole) of di-n-amyl phosphite and 51.5 grams of sulfur trioxide. The di-n-amyl phosphoric acid which resulted showed the following analysis:

Phosphorus _____percent__ 13.0

*Example 5*

The procedure of Example 1 was followed using 400 grams (1.3 moles) of di-2-ethylhexyl phosphite and 105 grams of sulfur trioxide. The resulting di-2-ethylhexyl phosphoric acid showed the following analyses:

Phosphorus _____percent__ 9.4
Acid number _____ 194

*Example 6*

A stream of dry air was passed in over the surface of liquid sulfur trioxide and thence into a 73-gram sample (0.23 mole) of di-(5-chloro-n-amyl) phosphite until a total of 28 grams (0.35 mole) of sulfur trioxide was consumed. The oxidation in this particular instance required 15 hours. The identity of the product was established as di-(5 chloro-n-amyl) phosphoric acid by the following analyses:

Phosphorus _____percent__ 9.0
Acid number _____ 159

*Example 7*

A 54-gram (0.211 mole) sample of dicyclohexyl phosphite was treated with a mixture of air and 25 grams (0.32 moles) of entrained sulfur trioxide throughout a period of 16 hours and within the temperature range of 20–30° C. The reaction mixture then was heated to a final temperature of 50° C. at 20 mm. so as to remove any unreacted sulfur trioxide. The residual product was identified as dicyclohexyl phosphoric acid by the following analyses:

Phosphorus _____percent__ 11.1
Acid number _____ 164

*Example 8*

A sample of diphenyl phosphite weighing 254 grams (1.0 mole) was treated with a mixture of air and 120 grams (1.5 mole) of entrained sulfur trioxide at 30° C. for a period of 24 hours. The reaction mixture then was heated to a final temperature of 80° C. at 20 mm. so as to remove the last traces of any unreacted sulfur trioxide. The resulting product was characterized as the desired diphenyl phosphoric acid by the following analyses:

Phosphorus _____percent__ 9.7
Acid number _____ 283

It will be noted that the product of this example contained an acid number greater than would be expected for diphenyl phosphoric acid. This was due to the incidental sulfonation of some of the phenyl nuclei.

Other modes of applying the principle of the invention

I, therefore, particularly point out and distinctly claim as my invention:

1. The proces of preparing substituted phosphoric acids having the structure

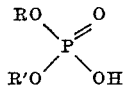

which comprises reacting sulfur trioxide with a substituted phosphite having the structure

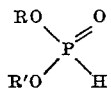

where R and R' are alkyl radicals.

2. The process of preparing substituted phosphoric acids having the structure

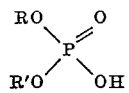

which comprises reacting sulfur trioxide with a substituted phosphite having the structure

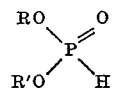

where R and R' are organic radicals selected from the class consisting of saturated hydrocarbon radicals, phenyl radicals, xenyl radicals and haloalkyl radicals.

3. The process of claim 2 characterized further in that the surfur trioxide is entrained by a stream of air prior to its introduction into the reaction mass.

4. The process of claim 2 characterized further in that the substituted phosphite is contained in a solvent during the reaction.

5. The process of claim 2 characterized further in that the temperature of the reaction mixture is maintained within the range of 20-75° C.

6. The process of preparing organic substituted phosphoric acids which comprises bubbling sulfur trioxide beneath the surface of a fluid mass which contains an organic phosphite having the structure

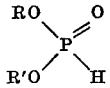

where R and R' are selected from the group consisting of saturated hydrocarbon radicals and haloalkyl radicals.

7. The process of claim 6 characterized further in that R and R' are chloroamyl radicals.

8. The process of claim 6 characterized further in that R and R' are lower alkyl radicals.

References Cited in the file of this patent

UNITED STATES PATENTS 2,059,084    Buchheim _____ Oct. 27, 1936